US005457909A

United States Patent [19]
Graves

[11] Patent Number: 5,457,909
[45] Date of Patent: Oct. 17, 1995

[54] FISHING WEIGHT ASSEMBLY

[76] Inventor: Herbert K. Graves, 810 E. Ruddock St., Covina, Calif. 91723

[21] Appl. No.: 316,218
[22] Filed: Sep. 30, 1994
[51] Int. Cl.$^6$ .................................................. A01K 95/00
[52] U.S. Cl. ............................................................ 43/44.91
[58] Field of Search ............................ 43/44.91, 44.87, 43/44.93, 44.89, 44.92, 44.9

[56] References Cited

U.S. PATENT DOCUMENTS

| 987,522 | 3/1911 | Williams | 43/44.91 |
|---|---|---|---|
| 2,764,838 | 10/1956 | Singer | 43/44.91 |
| 3,195,262 | 7/1965 | Metzler | D22/145 X |
| 4,177,599 | 12/1979 | Pettersen | 43/43.12 |
| 4,279,092 | 7/1981 | Hutson | 43/44.91 |
| 4,472,903 | 9/1984 | Hutson | 43/44.91 |
| 5,157,860 | 10/1992 | Clark | 43/44.9 |
| 5,305,534 | 4/1994 | Lazich | 43/44.91 |

Primary Examiner—Mark Rosenbaum
Assistant Examiner—Jeanne M. Elpel
Attorney, Agent, or Firm—Boniard I. Brown

[57] ABSTRACT

A fishing weight assembly includes a weight body with a central bore to receive a fishing line and an opening transversely of the bore, a retainer member adapted for insertion into the opening with portions compressible by walls of the opening upon insertion of the retainer member to clamp the line. Serrations on confronting portions off the retainer can better clamp the line. One embodiment has a radially extending slot for insertion of a fishing line. Edge portions of the weight adjacent to the weight body opening may be deformable to provide retaining ridges to prevent exit of the retainer.

17 Claims, 2 Drawing Sheets

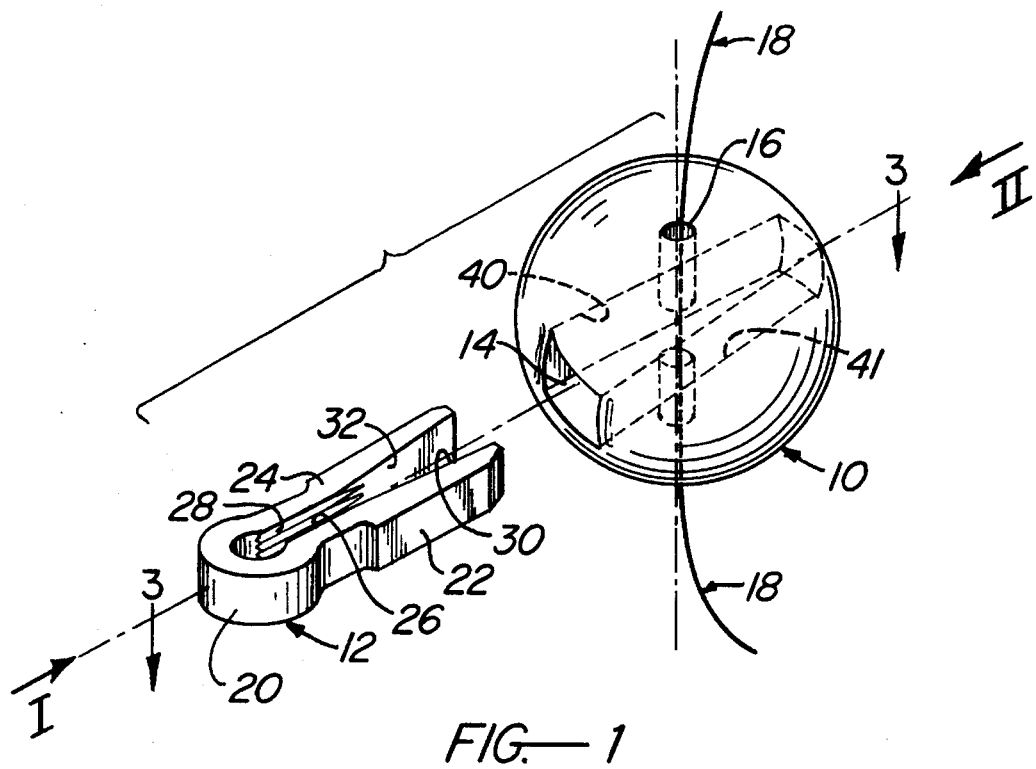
FIG.—1
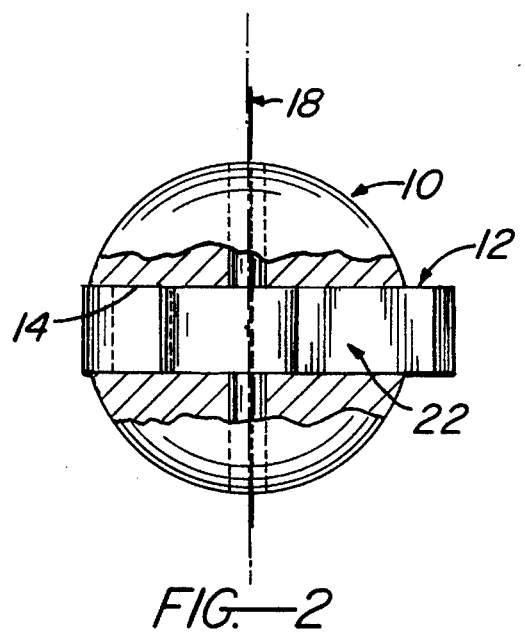
FIG.—2

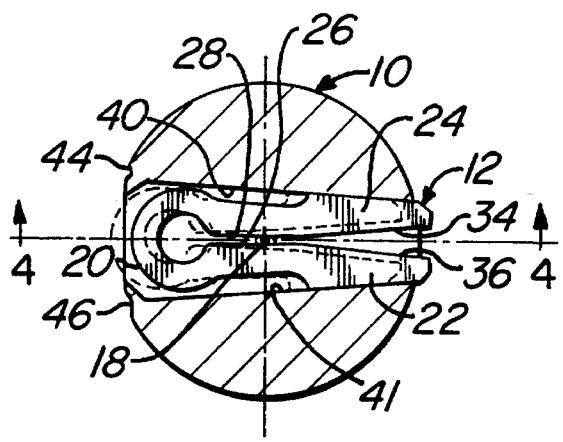
FIG.—3
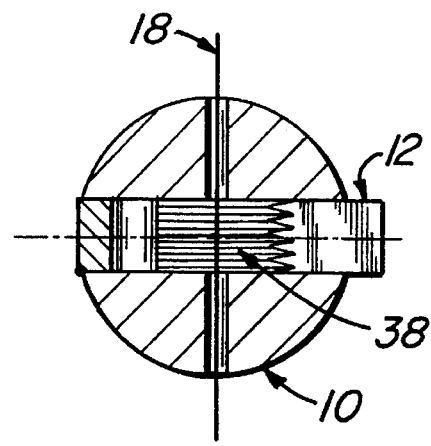
FIG.—4
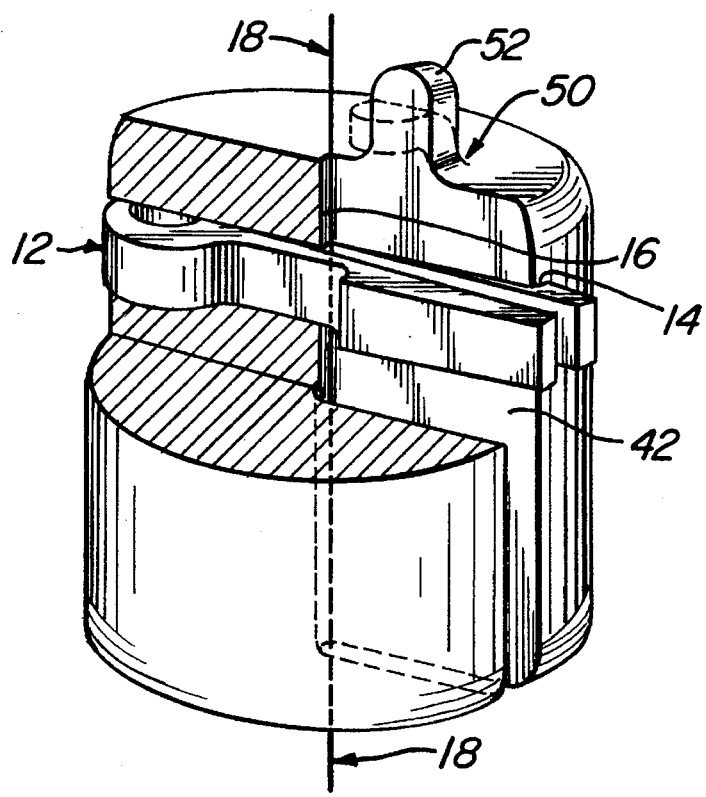
FIG.—5

FISHING WEIGHT ASSEMBLY

BACKGROUND OF THE INVENTION

It has long been known to utilize fishing weights or sinkers to fishing lines for the submerging of lures, baited hooks, etc., and various means and devices have been employed in the prior art. Some devices have required tools for attaching a weight to a line, some devices have limited or no reusability, such as weights crimped onto lines. The employment of knots is undesirable, because of time consumption, ineffectiveness, and often, necessity of cutting lines to remove or change a weight.

In most instances, it is desirable that the weight remain at a selected location on a line, and that it be capable of quick and convenient attachment and removal relative to the line. It is also desirable that it be reusable and relatively inexpensive to manufacture.

The prior art includes devices which employ inserts or retainers with weights to clamp or retain the weight in selected position on a fishing line. These include U.S. Pat. No. 5,157,860 to Clark, which employs a resilient insert pushed into a slot in a weight and retained to engage the line in a central bore of the weight.

U.S. Pat. No. 4,472,903 to Hutson utilizes a threaded bushing through which a fishing line is threaded and extended, and which threadedly engages threads defined in the weight to compress the bushing by the coaction of inclined interior walls of the weight, thus to clamp the line.

U.S. Pat. No. 5,305,534 to Lazich involves a sinker assembly of elongate configuration in which are defined two longitudinal slots in crossing arrangement, and a plastic retainer received therein. The retainer has a longitudinal bead for compression against slot edges to clamp the fishing line. This device is rather complicated, expensive and inconvenient.

There has been a need for a weight or sinker which is readily and conveniently attachable and removable relative to a fishing line, which is inexpensive to manufacture, requires no expertise or any tool, and is reusable many times without damage to weight or line. The object of the present invention is to meet such needs.

BRIEF SUMMARY OF THE INVENTION

The present invention relates to fishing weight assemblies for attachment to fishing lines, and comprises a weight body having therein a bore to receive a, fishing line, an opening defined in the weight body generally transversely of the bore and having converging walls, and a retainer adapted for insertion into and removal from the opening. The retainer is bifurcated, with a pair of arms which are compressible toward each other, upon insertion of the retainer into the opening, by coaction with the converging side walls. The fishing line is selectively clamped and released by manual manipulation of the retainer to engage or disengage it relative to the weight. The retainer arms may preferably have confronting portions defining serrations for securing a fishing line.

The weight body may preferably be formed of lead or other relatively heavy material, such as appropriate plastic, and the retainer may preferably be formed of a thermoplastic material.

In one preferred embodiment of the invention, a (radially extending) slot is defined in the weight body for insertion of a fish line at a selected position on the line.

The weight assembly may preferably include deformable edge portions adjacent to a wider end of the opening in the weight body, such at least one edge portion being deformable to define a ridge to prevent the retainer member from disengaging from the weight opening.

BRIEF DESCRIPTION OF THE DRAWINGS

FIG. 1 is an exploded perspective view of a preferred embodiment of the fishing weight assembly of the present invention;

FIG. 2 is an elevational view, partially in section, of the fishing weight assembly of FIG. 1 in assembled configuration;

FIG. 3 is a sectional view taken at line 3—3 in FIG. 1 of the fishing weight of FIG. 1 showing a retainer device of the invention in operative relation with a weight body;

FIG. 4 is a sectional view taken at line 4—4 in FIG. 3; and

FIG. 5 is a perspective view, partially in section, showing another embodiment of fishing weight assembly according to the invention.

DESCRIPTION OF PREFERRED EMBODIMENTS

Referring to the drawings, and particularly to FIG. 1, a preferred embodiment of the present invention is shown as comprising a fishing sinker or weight 10 and a retainer member 12. Defined in the weight 10 is an opening or passage 14 of generally rectangular cross-section, and a bore 16 which extends transversely of opening 14, and is sized for extension therethrough of a fishing line 18.

The retainer member 12 is bifurcated, with a head portion 20 defining a circular opening, and arms 22, 24 which have confronting inner walls 30, 32 with generally parallel inner portions 34, 36 which are generally parallel, and outer or distal portions 34, 36 (FIG. 3) which diverge in the distal direction. Defined on the confronting wall portions 26, 28 are ridges or serrations 38. The retainer 12 is sized and configured to fit within opening 14, and is formed of a resilient plastic material, such as nylon, that its arms 22, 24 are compressible between inclined walls 40, 41 of the opening (FIG. 3).

FIG. 5 illustrates a modified weight 50 according to the invention, which is of generally cylindrical configuration. Weight 50 is similar to weight 10, except that a radial slot 42 is defined in the weight and extends from the bore therein to its outer periphery, for the purpose of accommodating insertion of a fish line from the outer periphery. The slot 42 provides for the convenient engagement of the weight on a fish line at any selected position along the line, without necessity of threading the sinker or weight onto the line. In engaging the weight 50 on a fish line, the line is centered in position, in opening 14 when the retainer 12 is inserted to grip the fish line.

In utilizing a weight according to the invention, the weight is placed at a selected position along a fish line, and retainer 12 is positioned adjacent to openings 14 (FIG. 1). Retainer 12 is manually urged into the opening in the direction of arrow I, and into its service position of FIGS. 2 and 3, wherein the arms 22, 24 are compressed between the inclined walls 40, 41 of the opening (FIG. 3). The serrations 28 and tapered walls 40, 49 in the closed, gripping position of the retainer, secure the fish line 18 firmly relative to the weight.

The retainer 12 is preferably of such predetermined length relative to the length of the opening 14, that an end portion of the retainer extends outwardly from the opening, this being the distal end portions of the retainer arms when the retainer is installed in the opening, and a portion of the opposite head end portion prior to urging the retainer inwardly to clamp a fish line. The weight assembly is sold and provided to the user with the retainer installed but not compressed, and with a head end portion extending from the opening to facilitate manual insertion of the retainer.

To disengage the retainer from the weight, manual pressure is exerted on the distal ends of the arms 22, 24, in the direction of arrow II (FIG. 1) and the head portion is grasped at the opposite end of the retainer, and is pulled in the direction of arrow II from the weight.

The retainer may remain secured in the weight for a long period or the service life of the weight, or it may be removed and replaced at different times.

At least one edge portion of the weight adjacent the larger or insertion end of opening 14, is preferably so configurated that it is deformable or crimpable into the configuration indicated at 44, 46 in FIG. 3, thus to define a retaining ridge to prevent disengagement of the retainer from the weight body.

A tab 52 extends from the weight body (FIG. 5), and is bendable into the configuration indicated in broken lines, thus to secure the fishing line 16 in the bore and prevent the fishing line from moving outwardly from the slot 42.

Thus there has been shown and described a novel fishing weight assembly which fulfills all the objects and advantages sought therefor. Many changes, modifications, variations and other uses and applications of the subject invention will however, become apparent to those skilled in the art after considering this specification together with the accompanying drawings and claims. All such changes, modifications, variations and other uses and applications which do not depart from the spirit and scope of the invention are deemed to be covered by the claims which follow.

The inventor claims:

1. A weight assembly for attachment to a fishing line, comprising: a weight body having a bore for receiving the fishing line,
   an opening defined in said weight body extending generally transversely of said bore, said opening having converging sidewalls, and
   a retainer configurated and sized for insertion into and removal from said opening, said retainer being bifurcated and having a pair of arms compressible toward each other by said converging sidewalls upon said insertion to clamp the fishing line, whereby the fishing line may be selectively clamped or released by manipulation of the retainer to engage or disengage the retainer relative to said opening.

2. A weight assembly according to claim 1, wherein said bore is coincident with an axis of the weight body.

3. A weight assembly according to claim 2, wherein:
   confronting portions of said arms have serrations defined therein to clamp the fishing line.

4. A weight assembly according to claim 1, wherein:
   confronting portion of said arms have serrations defined therein to clamp the fishing line.

5. A weight assembly according to claim 4, wherein:
   the retainer arms have confronting distal wall portions which diverge in the distal direction.

6. A weight assembly according to claim 4, wherein:
   said weight body is formed of lead, and
   said retainer is formed of thermoplastic material.

7. A weight assembly according to claim 4, and further including:
   a radially extending slot defined in the weight body between said bore and the periphery of the weight body for insertion of the fish line into the bore at a selected position on the fishing line.

8. A weight assembly according to claim 7, and further comprising:
   tab on the weight body adjacent to said bore and bendable into position wherein it prevents at least a portion of the fish line in the bore from passing outwardly via said slot.

9. A weight assembly according to claim 4, and further comprising:
   at least one deformable edge portion adjacent to the wider end of said opening in the weight body, said edge portion being deformable to define a ridge to prevent said retainer from disengaging from the opening.

10. A weight assembly according to claim 4, wherein:
    said retainer is of such predetermined length relative to the length of said opening that at least one end portion of the retainer extends outwardly from the opening with the retainer inserted therein, whereby manual insertion or removal is facilitated by manual pressure on said end portion.

11. A weight assembly according to claim 1, wherein:
    the retainer arms have confronting distal wall portions which diverge in the distal direction.

12. A weight assembly according to claim 1, wherein:
    said weight body is formed of lead, and
    said retainer is formed of thermoplastic material.

13. A weight assembly according to claim 1, and further including:
    a radially extending slot defined in the weight body between said bore and the periphery of the weight body for insertion of the fish line into the bore at a selected position on the fishing line.

14. A weight assembly according to claim 13, and further comprising:
    at least one deformable edge portion adjacent to the wider end of said opening in the weight body, said edge portion being deformable to define a ridge to prevent said retainer from disengaging from the opening.

15. A weight assembly according to claim 13, and further comprising:
    a tab on the weight body adjacent to said bore and bendable into a position wherein it prevents at least a portion of the fish line in the bore from passing outwardly via said slot.

16. A weight assembly according to claim 1, and further comprising:
    at least one deformable edge portion adjacent to the wider end of said opening in the weight body, said edge portion being deformable to define a ridge to prevent said retainer from disengaging from the opening.

17. A weight assembly according to claim 1, wherein:
    said retainer is of such predetermined length relative to the length of said opening that at least one end portion of the retainer extends outwardly from the opening with the retainer inserted therein whereby manual insertion or removal is facilitated by manual pressure on said end portion.

* * * * *